Dec. 1, 1953  V. A. BARNHART  2,660,878
HOLLOW MASONRY BUILDING UNIT
Filed Sept. 11, 1946  2 Sheets-Sheet 1
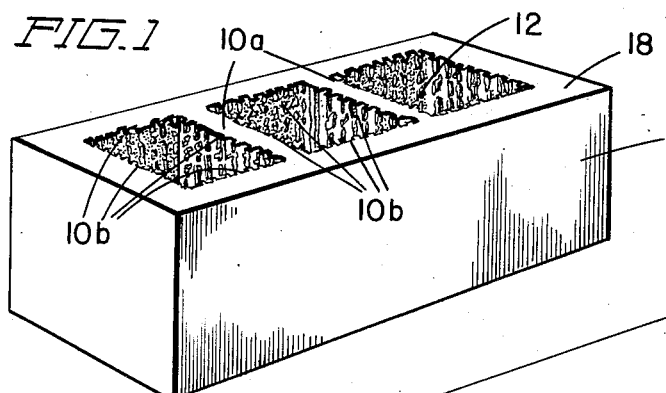
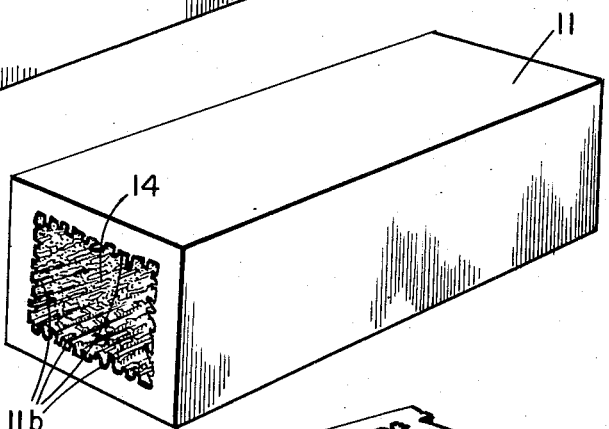
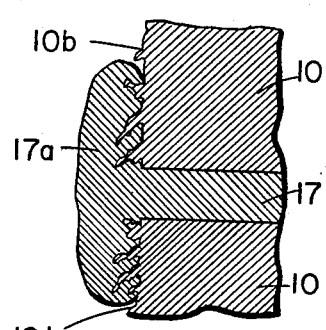
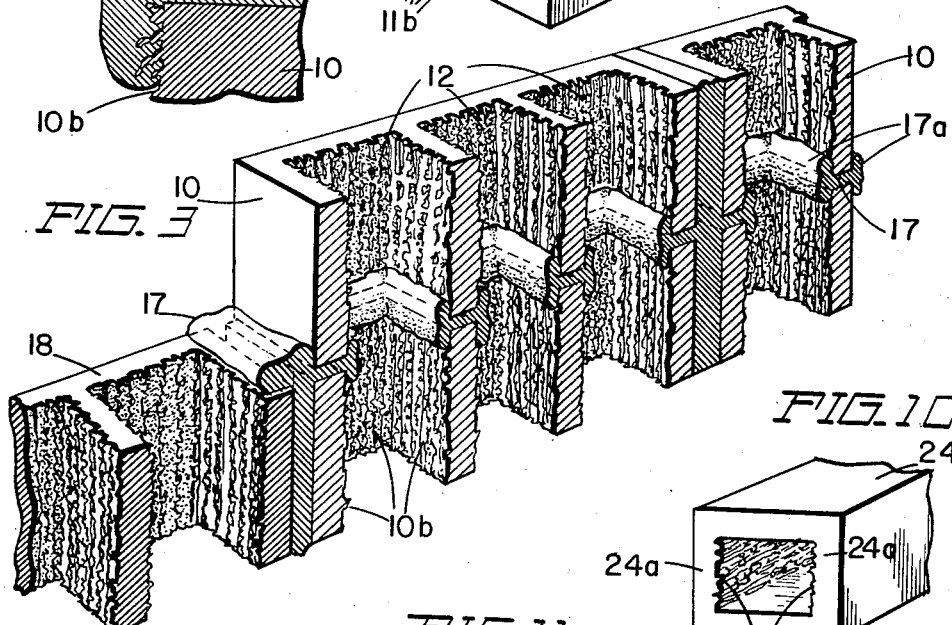
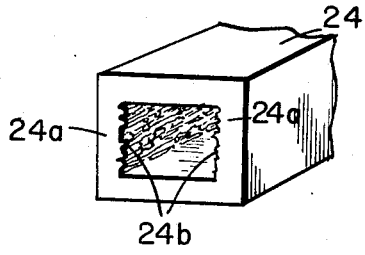
INVENTOR
VERN A. BARNHART
BY
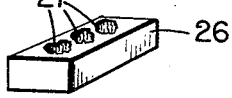
ATTORNEY Dec. 1, 1953 V. A. BARNHART 2,660,878
HOLLOW MASONRY BUILDING UNIT
Filed Sept. 11, 1946 2 Sheets-Sheet 2
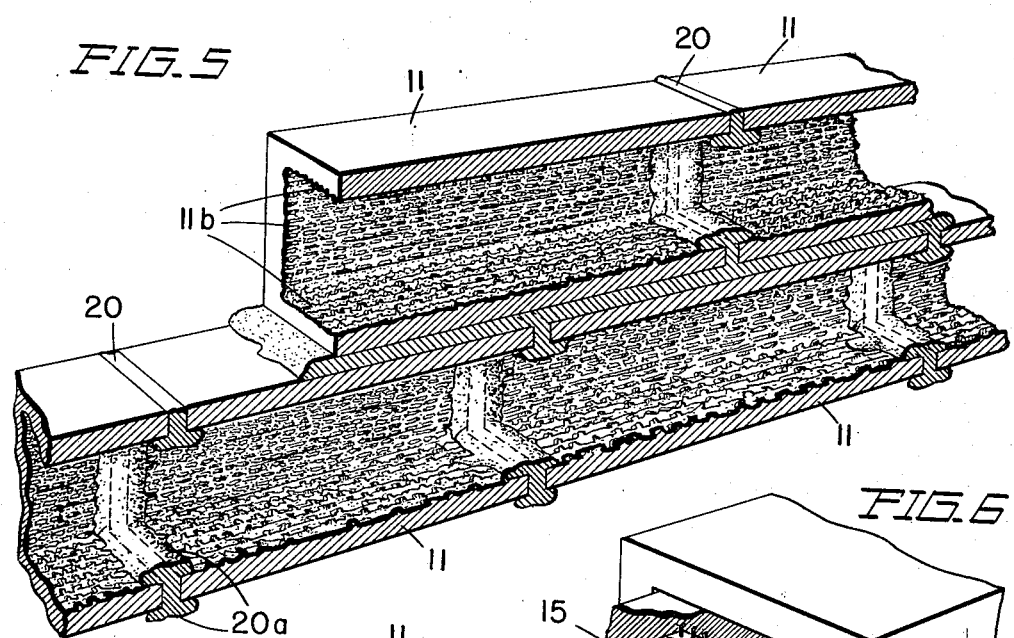
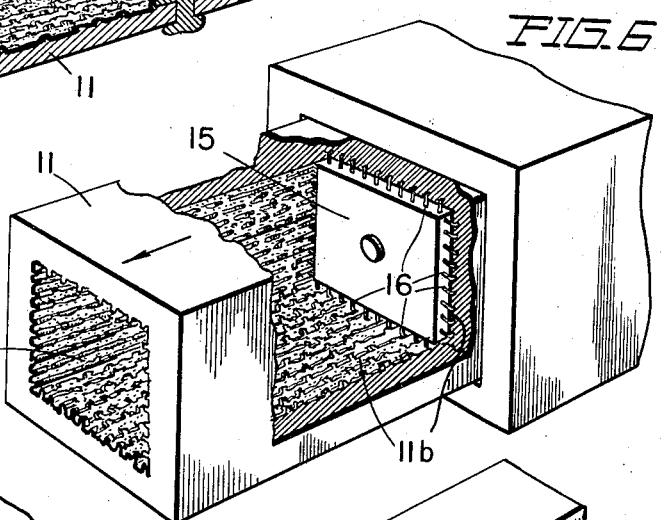
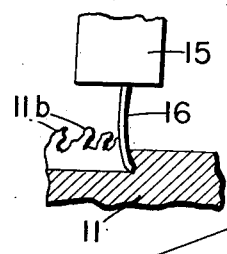
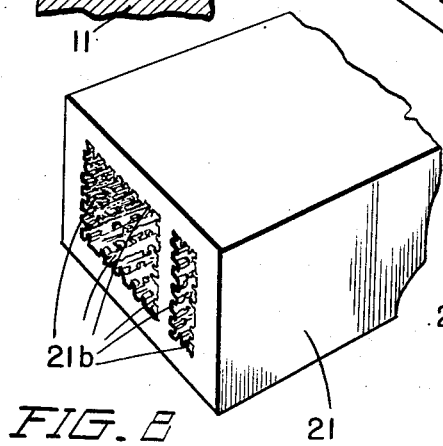
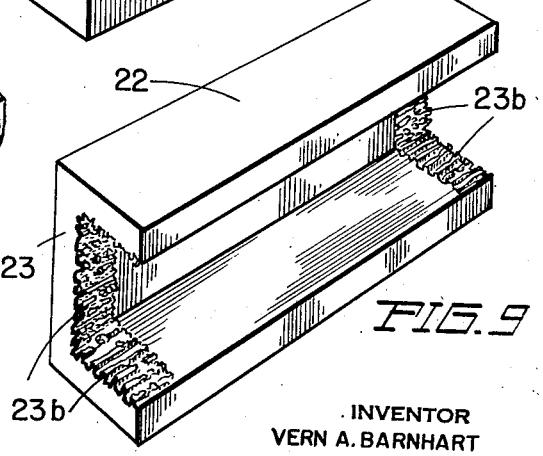
INVENTOR
VERN A. BARNHART
BY
ATTORNEY Patented Dec. 1, 1953

2,660,878

UNITED STATES PATENT OFFICE 2,660,878

HOLLOW MASONRY BUILDING UNIT

Vern A. Barnhart, Athens, Ohio

Application September 11, 1946, Serial No. 696,283

7 Claims. (Cl. 72—41)

This invention relates to masonry building units, and particularly to those provided with voids which open into the bonding surfaces.

Masonry building units of this type are made in a variety of different forms and of a variety of different materials. An example is the well known hollow structural tile made of clay and fired in a kiln. Both the peripheral walls and any partition walls that may be provided are comparatively thin in order to reduce weight and the quantity of material used. The wall surfaces are normally smooth and dense by reason of the manner in which the units are formed, the customary method being extrusion of the plastic clay through a suitable forming die, and cutting off of the individual unit lengths from the extruded column by means of wires.

Considerable difficulty has been experienced in the laying of such hollow structural tile units, because of the narrow and smooth nature of the bonding surfaces. Mortar adheres only with difficulty, and then in limited quantity which is likely to be depleted by the falling off of portions during the laying process. This is not only aggravating to the workman, who must apply additional portions of mortar to make up for that thus lost, but is extremely wasteful. The mortar usually falls into the interior of the wall where it cannot be recovered, and the working time lost by the mason is considerable. Furthermore, the resulting bond is a precarious one. It is thinner than desirable for strength and permanency, and is uncertain in its gripping characteristics. Too, due to the density and smoothness of the bonding surfaces—especially in instances of salt-glazed tile and other substantially impervious units—the time for setting of the mortar is inordinately long, thereby further delaying the mason in his work.

By the present invention I overcome the above difficulties in a very simple fashion which adds nothing to the weight of the unit and very little if anything to the cost of production. Prior to the setting or firing of the unit, and preferably during and as a part of the extrusion process, I scratch or plow up the skin surface of part or all of those interior walls of the unit which border the bonding surfaces. By "scratch or plow up" I mean the breaking up or roughening of the otherwise smooth and dense skin surface so that innumerable particles and curls of the material project out beyond what would otherwise be the normal tight-skin wall face. These add considerably to the wall thickness of the unit and, thus, to the actual bonding area. They also serve to catch and retain mortar exudate from the mortared joints, preventing loss and adding greatly to the size, strength, and permanence of the resulting joinder. Furthermore, because they render certain wall surface with which the mortar comes into intimate contact relatively porous, and thereby produce a suction effect, they speed the drying and setting of the mortar. Again, this roughness of wall surface and relatively greater porosity provide for the absorption of sound and prevent moisture condensation within the unit, thereby enhancing the insulating value of the units to an exceptional degree.

Accordingly, principal objects of the invention are:

(a) To reduce the time and labor necessary in using hollow masonry units in building construction;

(b) To greatly increase the strength and permanence of structures constructed with hollow masonry units;

(c) To lessen the cost of hollow masonry unit building construction;

(d) To substantially increase the insulating value of hollow masonry unit building construction;

(e) To provide a hollow masonry building unit having considerably greater bonding area than is customary, without increasing the weight or bulk of the unit and with little or no increase in manufacturing cost;

(f) To provide a hollow masonry building unit having sufficient porosity adjacent the bonding areas to produce effective suction characteristics, for accelerating the rate of mortar set and mortar grip;

(g) To increase the mortar grip, bonding, and setting area of hollow masonry building units;

(h) To provide a certain water permeability at critical bonding areas of otherwise impervious hollow masonry building units;

(i) To eliminate loose mortar joints in hollow masonry unit building construction;

(j) To provide for a certain amount of "breathing" of interior wall surfaces of hollow masonry unit building construction to prevent moisture condensation thereat;

(k) To increase the resistance of hollow masonry unit building construction to heavy impacts;

(l) To make it unnecessary to grind salt-glaze hollow masonry building units at critical bonding areas;

(m) To make practical the wide-spread use of substantially impervious hollow masonry building units;

(n) To effect substantial savings in the mortar cost of hollow masonry unit building construction;

(o) To accomplish the above economically, and with no increase in weight of the hollow masonry building units.

These and other objects and features of the invention will be more fully understood from the following detailed description of the preferred specific forms thereof illustrated in the accompanying drawings, wherein:

Fig. 1 represents a perspective view of a vertical type hollow structural tile building unit in accordance with the invention;

Fig. 2, a similar perspective view of a horizontal type unit;

Fig. 3, a perspective view, partially in vertical section, of a portion of a wall construction embodying two courses of the units of Fig. 1;

Fig. 4, an enlarged fragmentary portion of the wall construction of Fig. 3 in true vertical section;

Fig. 5, a perspective view similar to that of Fig. 3 but illustrating a wall constructed of the horizontal units of Fig. 2;

Fig. 6, a fragmentary perspective view partially in section illustrating a critical stage in the production by extrusion of the horizontal unit of Fig. 2;

Fig. 7, an enlarged fragmentary detail view in vertical section of the means employed in Fig. 6 for breaking or plowing the otherwise smooth and dense inner wall surfaces of the extruded tile building unit;

Fig. 8, a fragmentary perspective view of a somewhat different type of masonry building unit in accordance with the invention;

Fig. 9, a view similar to that of Fig. 5 but showing only one of the masonry building units, such unit having the scratching and roughening of its inner wall faces arranged in a somewhat different manner;

Fig. 10, a fragmentary view corresponding to that of Fig. 2 but illustrating a unit in which the scratching and roughening of the inner wall faces is arranged in still a different manner;

Fig. 11, a perspective view of a cored form of standard building brick to which the invention has been applied.

Referring now to the drawings, and particularly to Figs. 1 through 7 thereof: hollow masonry building units of the structural tile variety are customarily produced in the form of vertical type and horizontal type units, the head joints of the former being disposed horizontally between adjoining masonry courses and those of the latter vertically between adjoining units within a course. The horizontal type is usually spoken of as a "side set unit," and presents a special problem in the making of the vertically disposed head joint, wherein a relatively thin band of wet mortar must be made to stand vertically between the adjoining units until set.

In Fig. 3 is illustrated part of a building construction made up of vertical type hollow tile units 10, illustrated per se in Fig. 1, and in Fig. 5 is illustrated a part of a similar building construction made up of horizontal type hollow tile units 11, illustrated per se in Fig. 2.

Both types of units are formed in accordance with the invention, that is to say, with the interior wall surfaces thereof roughened considerably. As illustrated, the roughening is of scarified, namely, of scratched or plowed-up nature, wherein particles of the surface are loosened and project outwardly beyond the normal surface line.

The vertical type unit 10 has its hollow interior divided by partition walls 10a into vertically extending voids 12, and it is the interior walls defining these voids that are roughened, such plowed-up surfaces being indicated 10b.

In the case of the horizontal type unit 11, a single void 14 extends completely through the unit. The plowed-up interior surfaces 11b defining the void are similar to the surfaces 10b of the vertical type unit of Fig. 1.

The roughening or plowing-up of these interior surfaces of units conforming to the invention is advantageously accomplished during the forming process. A usual method of forming structural tile units is to extrude the plastic clay through a suitable extrusion die, cutting off the individual units from the continuous extrudate by fine, tightly stretched wires. Pursuant to the invention and as a feature thereof, the interior, void-defining surfaces of the units are roughened during the extrusion process without complicating that process or increasing its cost. To this end, the core block of the die is provided with an auxiliary section spaced therefrom farther along the line of material flow. Such an auxiliary section is designated 15 in Fig. 6, where a horizontal type unit is shown in the process of being formed, the appended arrow indicating the direction of material flow. As there illustrated, see also Fig. 7, the auxiliary section 15 comprises a die block slightly smaller in periphery than the main die block, and scratching or plowing elements 16 inset in closely spaced relationship about the peripheral surface thereof, such elements 16 extending outwardly into the line of travel of the smoothly formed interior surfaces of the extrudate, and being of sufficient length to satisfactorily penetrate the smooth surface skin, raising or plowing-up the surface and near-surface particles as the extrudate travels by.

The depth of penetration of the scratching or plowing elements and the extent of raising up of surface and subsurface particles may be determined as seen fit in the particular case. Ordinarily, such scratching or plowing-up will be extensive, projecting particles and small curls of the material as far as $\frac{3}{16}$ inch or more beyond the normal smooth skin surface without detaching them from the main body. The average extension of the surface outwardly of the main body of material will approximate ⅛ of an inch very effectively in most instances of practical application.

I have found that curving the scratching or plowing elements 16 against the material flow, as shown, or setting them at an acute angle thereagainst is decidedly advantageous, producing considerably greater roughness than if they project straight from the die blocks at right angles to the plow.

Considering now the use of hollow masonry units formed in accordance with the invention, in building with the vertical units 10, as illustrated in Fig. 3, mortar 17 is applied to the relatively narrow horizontal bonding surfaces 18 in quantity sufficient to provide the requisite mortar joint. Under the pressure of a superimposed unit, portions of the mortar exude outwardly of the joint, curling upwardly and downwardly. With units of conventional construction having smooth dense interior wall surfaces, these curls of mortar almost invariably slip and slough off, falling through the voids to the ground. Besides the waste thus caused, the loss of these portions of the mortar seriously weakens the resulting joint. With units formed in accordance with the invention, however, the mortar exudate grips the roughened surfaces bordering the joinder and remains as an integral part of the resulting joint, see the exudate 17a, Figs. 3 and 4.

The retention of the mortar exudate 17a does more than enhance the strength of the joint; it means that a substantial portion of the wet mortar of the joint is in contact with relatively porous bonding areas of the masonry units, and that the entire body of mortar benefits from the suction characteristics exhibited by these areas. That is to say, the entire mortar joint sets more rapidly and securely.

In building with the horizontal units 11, as illustrated in Fig. 5, vertical head joints 20 must be made to stand up between the narrow end surfaces of the units until the mortar sets. This is exceedingly difficult to accomplish with ordinary units, and a mason must be not only highly skilled but also extremely patient to work successfully. He must wait for the mortar to partially set before tooling the vertical joints, which means slower work and greater building cost. With units formed in accordance with the invention, however, here specifically the units 11, little if any difficulty is experienced by even a relatively unskilled mason. The exudate 20a curling to either side of the joint around the extent thereof is gripped by the projecting particles of the roughened interior wall surfaces 11b and held firmly, enabling tooling of the vertical joints without delay and producing a strong and effective joinder.

If desired, the invention may be applied to double wall units of the horizontal type, as illustrated by the unit 21, Fig. 8, where roughened interior walls 21b are provided throughout.

In some instances it may be desirable to roughen only those portions of the interior wall surfaces of the unit which are marginal to the bonding areas thereof. In Fig. 9 is illustrated a horizontal type unit 22 having only the marginal portions 22b adjacent the respective end bonding areas 23 roughened in accordance with the invention.

Again it may be desirable in certain instances to have only the two face or bearing walls roughened interiorly, either in full, or marginally. Thus, in Fig. 10 the horizontal unit 24 has only the interior surfaces of its respective face or bearing walls 24a roughened pursuant to the invention, as indicated at 24b.

Standard shaped bricks of the cored variety, particularly impervious types, may be formed in accordance with the invention to advantage. As illustrated in Fig. 11, where a standard shaped brick 26 provided with the open cores 27 is shown, the interior wall faces of the cores may be roughened in the manner disclosed hereinbefore, forming relatively porous mortar-grip surfaces which aid considerably in the setting of the mortar joints between adjoining bricks.

In all instances the roughened surfaces, to the extent provided, fulfill more than a mortar gripping and retaining function. They prevent or considerably lessen moisture condensation within wall construction, because of the relatively great increase in surface porosity—an increase of twice according to experimental evidence. Further, they enable the units to dry more quickly in the manufacture thereof, an advantage which lessens the cost of production; and they also provide insulating value of no little significance, as hereinbefore mentioned.

The method of roughening as herein set forth is a decided advantage in the production of the units, though the roughening may be effected in a variety of ways, for example, by a hand tool after the forming but before the burning or hardening of the units. Thus, it will be seen that although the illustrated furrowing provides an advantageous roughened formation, a variety of other types of roughening treatments within the skill of the art, which break the otherwise skintight surface and project particles of the material therebeyond, may be employed.

Whereas this invention has been described with respect to certain specific forms thereof it should be understood that various other forms may be produced from time to time by those skilled in the art on the basis of the teachings hereof without departing from the generic purview of the invention as defined by the following claims.

I claim:

1. A hollow masonry building unit having at least one interior void which opens at opposite ends into opposite mortar bonding faces of the unit and is otherwise enclosed by walls whose interior surfaces have numerous scarifications disrupting them and rendering them rough and porous, said scarifications comprising alternate ridges and furrows lying side-by-side along said wall surfaces and extending substantially perpendicularly to and individually intersecting and opening into said opposite mortar bonding faces, so that the excess of mortar applied to said bonding faces and exuding therefrom in the laying of the units will tend to flow naturally into and along said furrows and cling to said rough wall surfaces, and excess liquid in said mortar will be absorbed through said porous wall surfaces into the body of the unit.

2. The building unit recited in claim 1, wherein the building unit is a fired, extruded clay, structural tile.

3. The building unit recited in claim 2, wherein the structural tile is a side-set horizontal unit having the mortar bonding faces vertically disposed.

4. The building unit recited in claim 1, wherein the building unit is a brick cored to provide said void.

5. A hollow masonry building unit having at least one interior void which opens at opposite ends into opposite, vertically spaced, mortar bonding faces of the unit and is otherwise enclosed by walls whose interior surfaces have numerous scarifications disrupting them and rendering them rough and porous, said scarifications comprising alternate ridges and furrows lying side-by-side along said wall surfaces and extending substantially perpendicularly to and individually intersecting and opening into said opposite mortar bonding faces, so that the excess of mortar applied to said bonding faces and exuding therefrom in the laying of the units will tend to flow naturally into and along said furrows and cling to said rough wall surfaces, and excess liquid in said mortar will be absorbed through said porous wall surfaces into the body of the unit.

6. The building unit recited in claim 5, wherein the building unit is a fired, extruded clay, structural tile.

7. The building unit recited in claim 5, wherein the building unit is a brick cored to provide said void.

VERN A. BARNHART.

References Cited in the file of this patent

UNITED STATES PATENTS

| Number | Name | Date |
|---|---|---|
| D. 60,256 | Mullins | Jan. 17, 1922 |
| 989,677 | Wiederholdt | Apr. 18, 1911 |
| 1,411,532 | Straight | Apr. 4, 1922 |
| 1,419,713 | Bevier | June 13, 1922 |
| 1,485,007 | Zahn | Feb. 26, 1924 |
| 1,524,612 | Anderson | Jan. 27, 1925 |
| 1,642,417 | Kovanda et al. | Sept. 13, 1927 |
| 2,022,928 | Stewart | Dec. 3, 1935 |
| 2,120,742 | Grundy | June 14, 1938 |
| 2,123,853 | Miller | July 12, 1938 |
| 2,198,399 | Tefft | Apr. 23, 1940 |
| 2,209,643 | Chamblin | July 30, 1940 |
| 2,281,121 | Straight | Apr. 28, 1942 |